United States Patent
Yeh

(10) Patent No.: US 9,581,884 B2
(45) Date of Patent: Feb. 28, 2017

(54) COOLING SYSTEM FOR A PROJECTOR

(71) Applicant: HON HAI PRECISION INDUSTRY CO., LTD., New Taipei (TW)

(72) Inventor: Chin-Wen Yeh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/721,739

(22) Filed: May 26, 2015

(65) Prior Publication Data

US 2016/0313632 A1    Oct. 27, 2016

(30) Foreign Application Priority Data

Apr. 27, 2015 (CN) .......................... 2015 1 0203883

(51) Int. Cl.
G03B 21/16 (2006.01)
H04N 9/31 (2006.01)
F21V 29/67 (2015.01)

(52) U.S. Cl.
CPC ............ G03B 21/16 (2013.01); F21V 29/673 (2015.01); *H04N 9/3144* (2013.01)

(58) Field of Classification Search
CPC ...... G03B 21/16; H04N 9/3144; F21V 29/02; F21V 29/505; F21V 29/503; F21V 29/60; H01J 61/52; H01J 61/523; H01J 61/526

USPC ................ 353/60, 61, 57, 58; 362/373, 294
See application file for complete search history.

(56) References Cited

U.S. PATENT DOCUMENTS

| | | | |
|---|---|---|---|
| 2004/0145896 A1* | 7/2004 | Watanabe | F21V 29/02 362/294 |
| 2006/0203447 A1* | 9/2006 | Kyle | H05K 7/20172 361/695 |
| 2010/0108855 A1* | 5/2010 | Hsiao | G03B 21/16 248/672 |

* cited by examiner

*Primary Examiner* — William C Dowling
*Assistant Examiner* — Ryan Howard
(74) *Attorney, Agent, or Firm* — Zhigang Ma

(57) ABSTRACT

An air duct is secured in a projector. The air duct is configured to help a fan module to cool a light emitting module. The fan module defines an air vent. Each side of the light emitting module defines an opening. The air duct defines a hollow cavity. Two ends of the cavity respectively define an air inlet and an air outlet. The air inlet is aligned with the air vent and the air outlet is aligned with the opening. The airflow passes through the air vent and the air inlet to enter into the cavity. Then, the airflow passes through the air outlet and the opening to enter into the light emitting module. Finally, the airflow goes out from another opening to dissipate the heat of the light emitting module.

12 Claims, 6 Drawing Sheets

COOLING SYSTEM FOR A PROJECTOR

CROSS-REFERENCE TO RELATED APPLICATION

This application claims priority to Chinese Patent Application No. 201510203883.0 filed on Apr. 27, 2015, the contents of which are incorporated by reference herein.

FIELD

The subject matter herein generally relates to an air duct for a cooling system for a light emitter.

BACKGROUND

In projectors, the temperature of the light emitting module is high and causes a great deal of heat. In order to quickly dissipate the heat a fan is installed to cool the light emitting module. However, because the interior of the projector is often crowded, the airflow driven by the fan cannot directly enter into the light emitting module.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
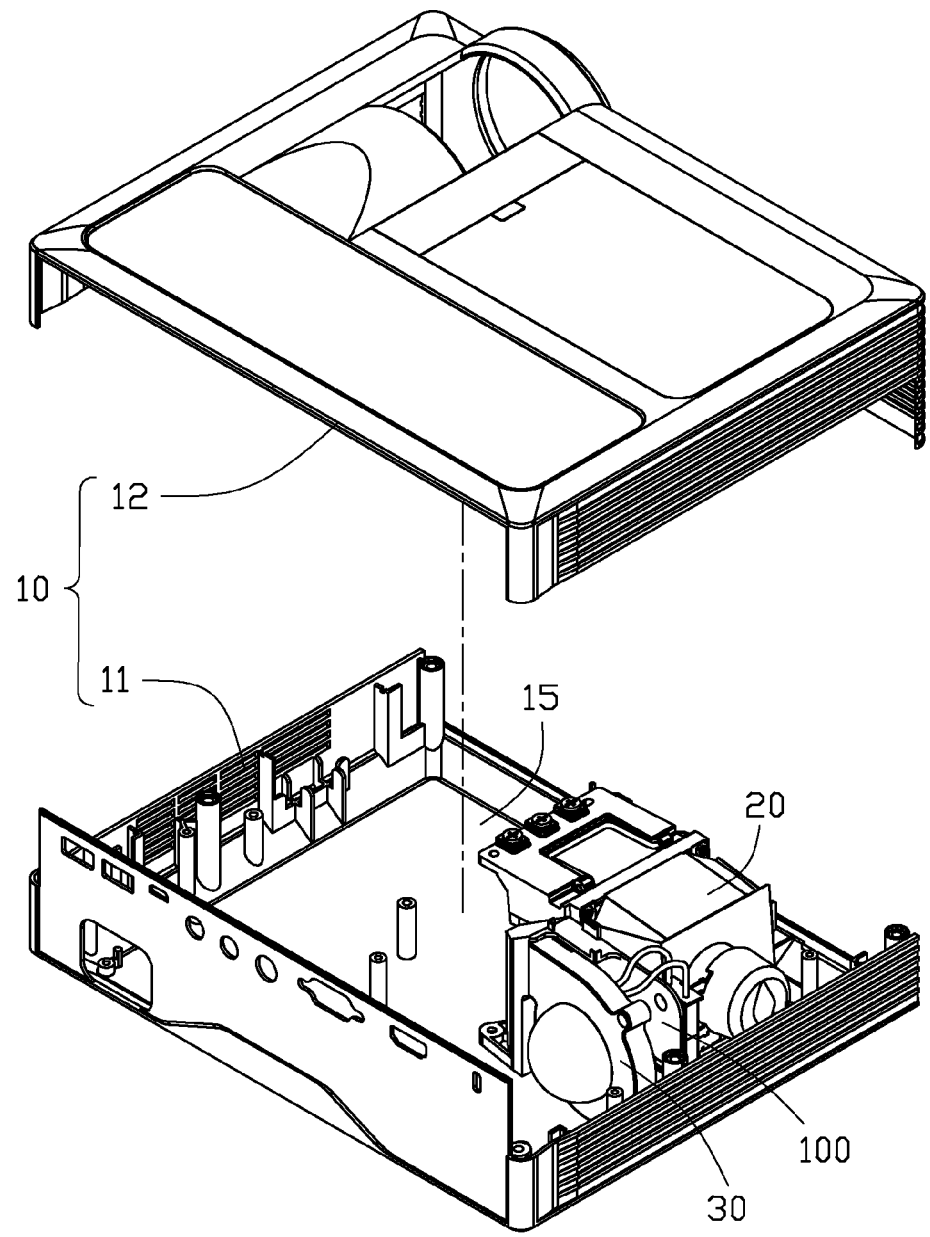
FIG. 1 is an isometric, partially assembled view of an embodiment of an air duct and a projector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates one embodiment of an air duct 100. The air duct 100 is received in a projector 10. The air duct 100 is configured to help a fan module 30 to cool a light emitting module 20.

Figure 2:
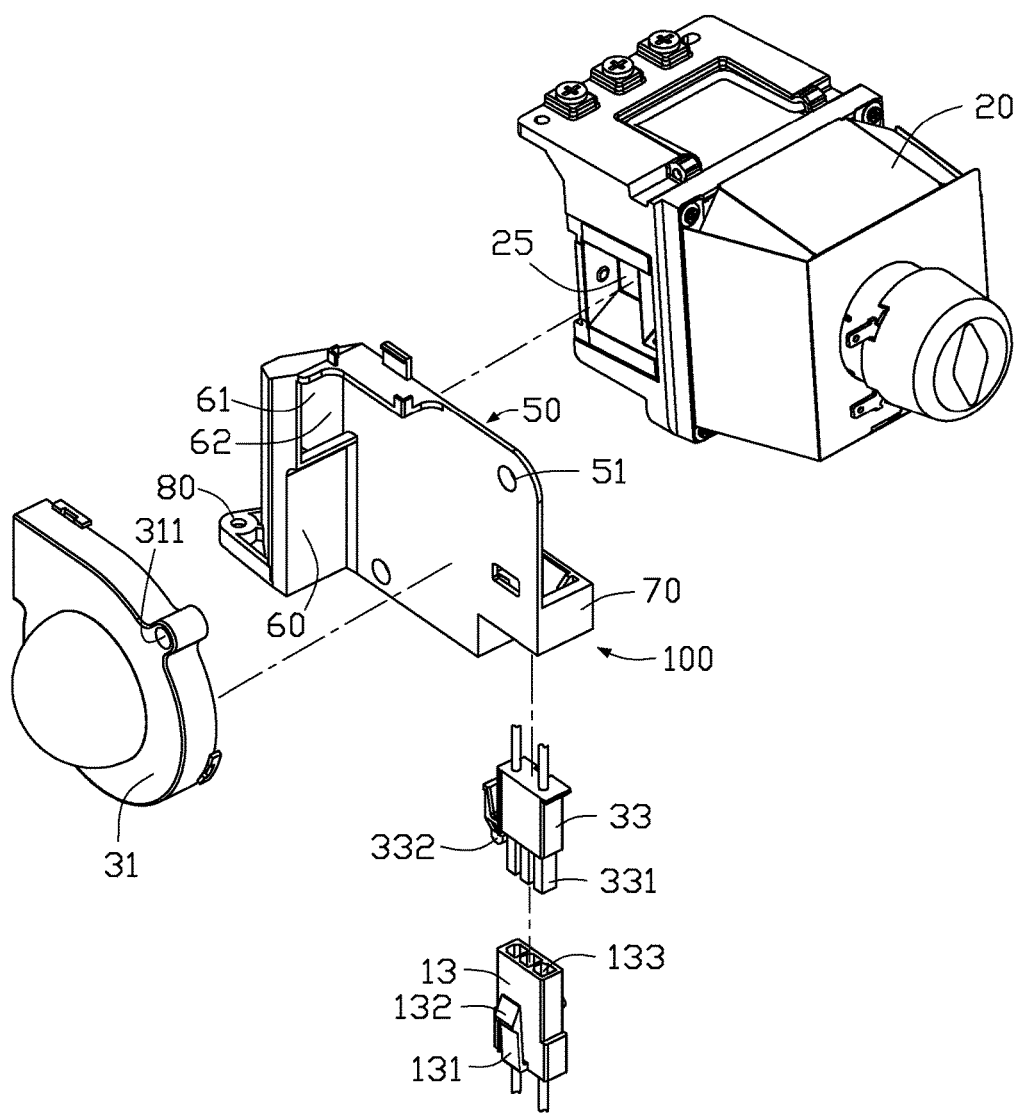
FIG. 2 is an isometric, exploded view of the air duct, a light emitting module and a fan module.

FIGS. 1 and 2 illustrate that the projector 10 includes a bottom 11 and a cover 12. The base bottom 11 and the cover 12 cooperatively define a receiving space 15. The light emitting module 20, the fan module 30 and the air duct 100 are received in the receiving space 15. A connector 13 is located on the base bottom 11. Each side of the connector 13 is equipped with a latch plate 131 which can be elastically deformed. One end of the latch plate 131 is equipped with a latch block 132. One end of the connector 13 defines a plurality of interfaces 133 and is equipped with a stopper block 135 (shown in FIG. 3).

Figure 3:
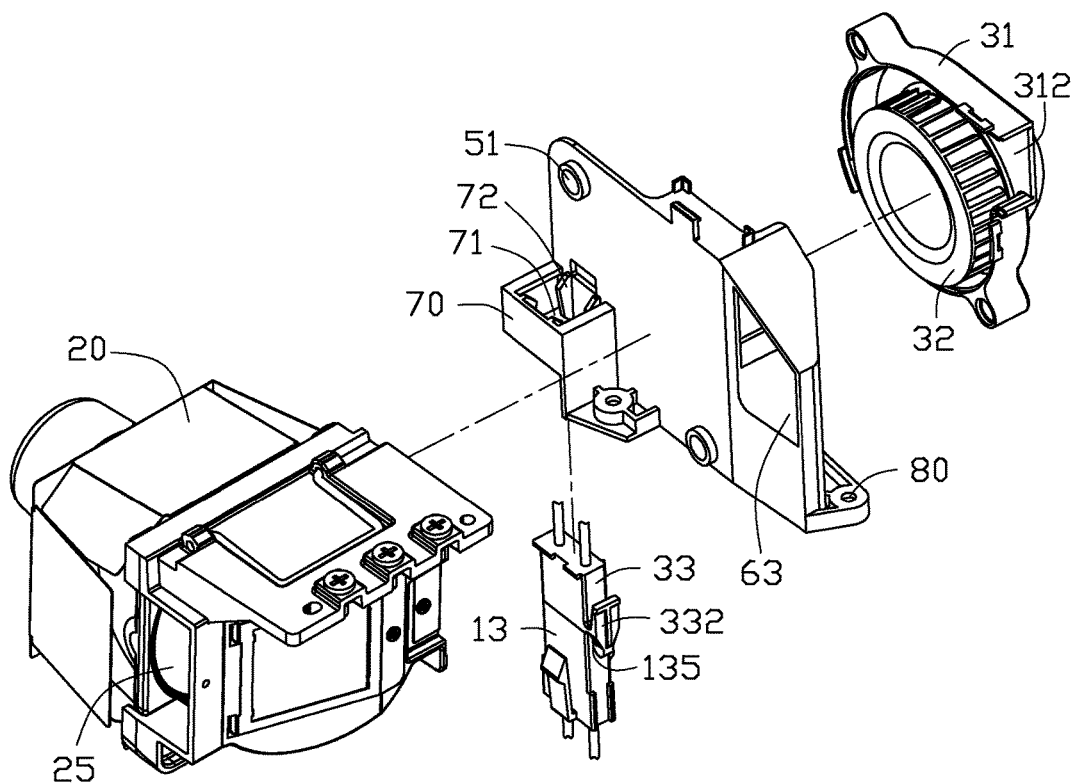
FIG. 3 is similar to FIG. 2, but viewed from a different angle.

FIGS. 2 and 3 illustrate that each side of the light emitting module 20 defines an opening 25. The airflow can pass through the opening 25 and enter into the light emitting module 20 to dissipate the heat of the light emitting module 20. The fan module 30 includes a bracket 31, a fan 32 secured in the bracket 31 and a plug 33. In at least one embodiment, the fan 32 is a turbo fan. The bracket 31 defines a plurality of securing holes 311 and an air vent 312. One end of the plug 33 is equipped with a plurality of pins 331 and a hook 332 which can be elastically deformed.

The air duct 100 includes a base plate 50, a guiding portion 60 connected with one end of the base plate 50, and a securing portion 70 connected with another end of the base plate 50. The base plate 50 defines a plurality of positioning holes 51. The guiding portion 60 defines a hollow cavity 61. Two ends of the cavity 61 respectively define an air inlet 62 and an air outlet 63. An air inlet plane on which the air inlet 62 defined is substantially perpendicular to an air outlet plane on which the air outlet 63 defined. The air inlet 62 corresponds to the air vent 312, and the air outlet 63 corresponds to the opening 25. The securing portion 70 defines a hollow through hole 71. Four protrusions 72 are located at the two sides of the through hole 71. Two mounting holes 80 are located on the air duct 100 adjacent to the guiding portion 60 and the securing portion 70.

Figure 4:
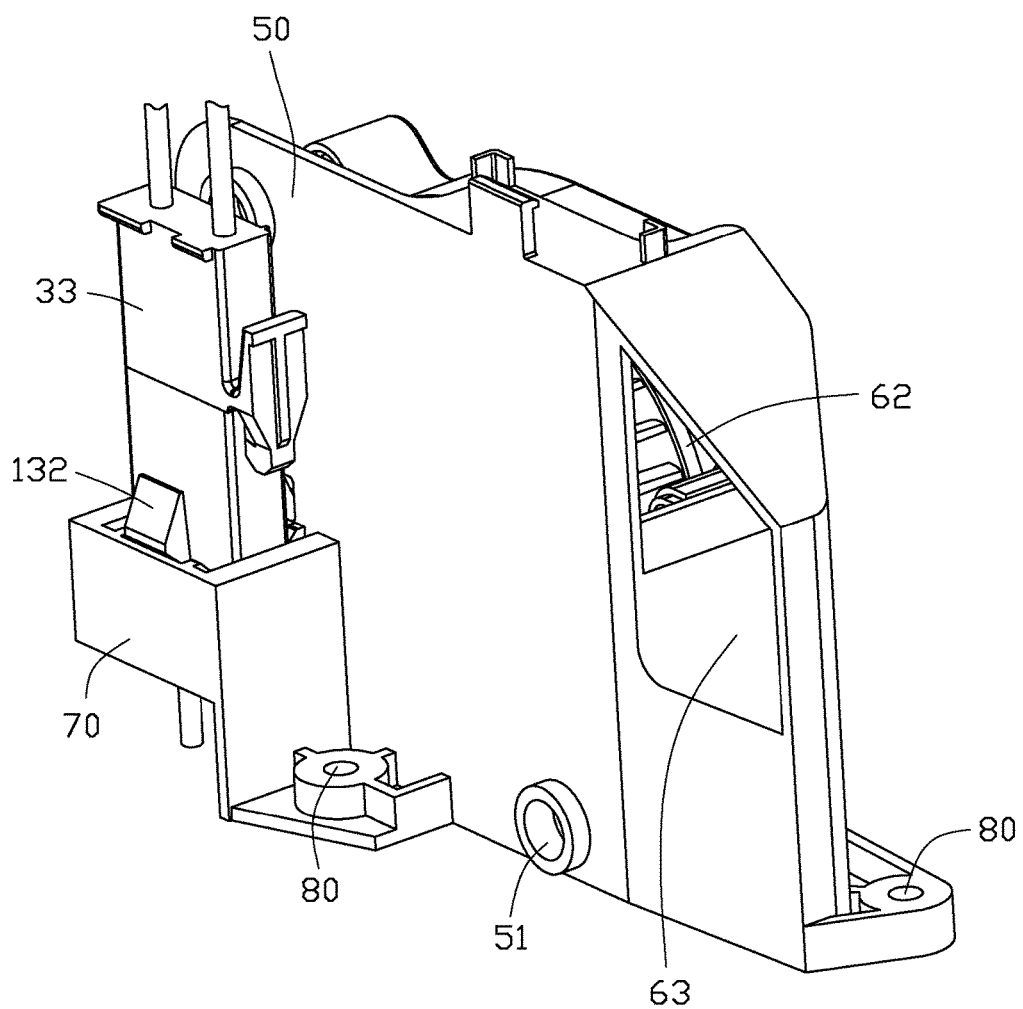
FIG. 4 is an isometric, assembled view of the air duct and the fan module of FIG. 3.
Figure 5:
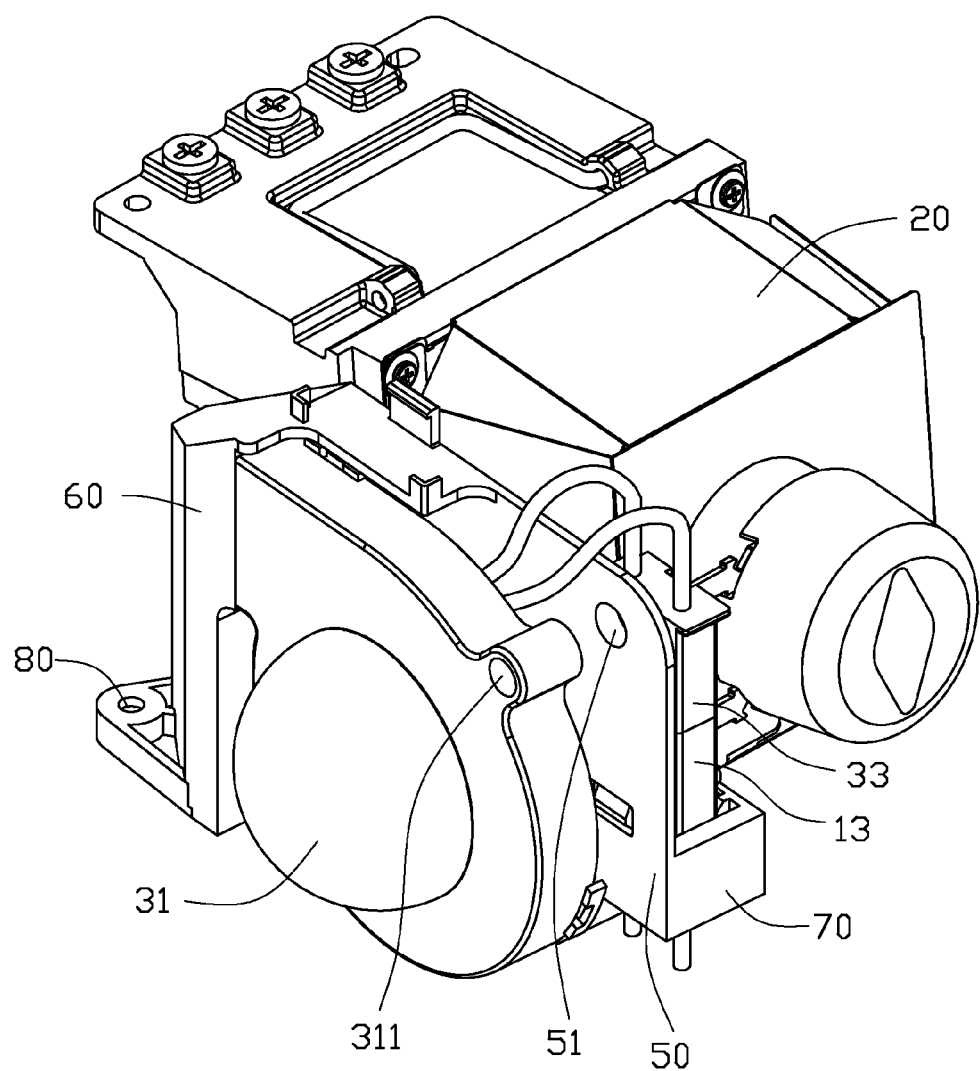
FIG. 5 is an isometric, assembled view of the air duct, the light emitting module and the fan module of FIG. 4.
Figure 6:
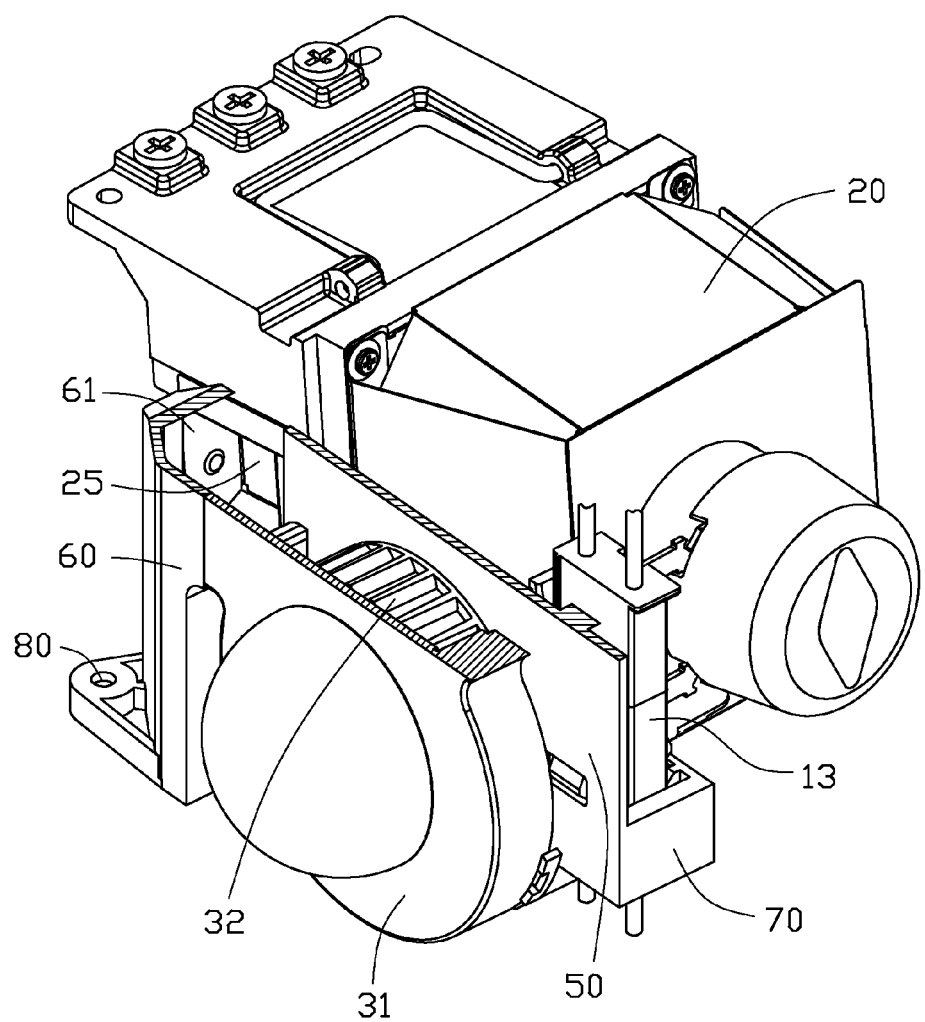
FIG. 6 is similar to FIG. 4, but viewed from a different angle.

FIGS. 4 to 6 illustrate when in assembly, the fan 32 is secured in the bracket 31. The fan module 30 is located on one side of the base plate 50. The securing hole 311 of the bracket 31 is aligned with the positioning hole 51 of the base plate 50. The air vent 312 is aligned with the air inlet 62 of the guiding portion 60. A plurality of securing members (not shown) pass through the securing holes 311 and insert into the positioning holes 51 to fix the fan module 30 on the base plate 50. Then, the fan module 30 is secured on the air duct 100.

The light emitting module 20, the fan module 30 and the air duct 100 are placed in the receiving space 15. The light emitting module 20 is secured on the base bottom 11. The air duct 100 is placed on the one side of the light emitting module 20. The air outlet 63 of the air duct 100 is aligned with the opening 25 of the light emitting module 20. The connector 13 is inserted into the through hole 71 of the securing portion 70. The latch plates 131 are elastically deformed to pass through the protrusions 72. When the latch plates 131 pass through the protrusion 72, the latch plates 131 elastically recover securing the latch blocks 132 on the protrusions 72. Then, the connector 13 is secured on the air duct 100. The plug 33 electrically connects the fan 30 to the connector 13. The pins 331 are inserted into the interfaces 133. The hook 332 is elastically deformed and secured on the stopper block 135 to connect the plug 33 with the connector 13. The securing members pass through the mounting holes 80 and insert into the bottom 11 to fix the air duct 100 on the bottom 11. The cover 12 is secured on the base bottom 11. Then, the projector 10 is completely assembled.

When the projector 10 is working, the fan 30 drives the airflow through the air vent 312 and the air inlet 62 and into the cavity 61. Then, the airflow passes through the air outlet 63 and the opening 25 to enter into the light emitting module 20, and finally out of the light emitting module 20 from another opening 25 to dissipate the heat of the light emitting module 20.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A cooling system for a projector, comprising:
a fan module comprising a fan and a bracket defining an air vent;
an air duct comprising a hollow cavity, the hollow cavity defining an air inlet and an air outlet, the air inlet being defined at an air inlet plane which is substantially perpendicular to the air outlet being defined at an air outlet plane; and
a light emitting module fluidically coupled to the air outlet;
wherein the fan drives airflow through the air vent and the air inlet into the hollow cavity, and further through the air outlet into the light emitting module to cool the light emitting module, the air duct comprises a base plate, the bracket is secured on the base plate, the air duct also comprises a guiding portion connected on one end of the base plate and a securing portion connected on another end of the base plate, the hollow cavity is located on the guiding portion, a connector of the projector is configured to be secured in the securing portion, the securing portion defines a through hole, a plurality of protrusions are located at the two sides of the through hole, the connector is configured to pass through the through hole, and the protrusions are configured to secure the connector in the through hole.

2. The cooling system of claim 1, wherein the base plate defines a plurality of positioning holes, the bracket defines a plurality of securing holes, a plurality of securing members pass through the securing holes and inserted into the positioning hole to secure the bracket on the base plate.

3. The cooling system of claim 1, wherein the fan is received in the bracket, the fan is configured to drive the airflow to cool the light emitting module.

4. The cooling system of claim 3, wherein the fan module comprises a plug, the projector comprises a connector, the plug is configured to be inserted into the connector.

5. The cooling system of claim 1, wherein the each side of the connector is equipped with a latch plate, one end of the latch plate is equipped with a latch block, the latch plate can be elastically deformed to pass through the protrusions and to let the latch block be secured on the protrusions.

6. The cooling system of claim 1, wherein the air duct defines a plurality of mounting holes, a plurality of securing members are configured to pass through the mounting holes to secure the air duct in the projector.

7. A projector combination, comprising:
a light emitting module defining two openings;
a fan module comprising a bracket, the bracket defining an air vent; and
an air duct comprising a base plate and defining a hollow cavity, the hollow cavity defining an air inlet and an air outlet, bracket being secured on the base plate;
wherein the air inlet is aligned with the air vent, the air outlet is aligned with the one of the two openings, air flows through the air vent and the air inlet into the hollow cavity, and further through the air outlet and one of the two openings into the light emitting module, and goes out of the light emitting module from another one of the two openings to take away the heat of the light emit emitting module, the bracket is secured on the base plate, the air duct comprises a guiding portion connected one end of the base plate and a securing portion connected on another end of the base plate, a connector of the projector is configured to be secured in the securing portion, the hollow cavity is located on the guiding portion, the securing portion defines a through hole, a plurality of protrusions are located at the two sides of the through hole, the connector is configured to pass through the through hole, the protrusions are configured to secure the connector in the through hole.

8. The projector combination of claim 7, wherein the base plate defines a plurality of positioning holes, the bracket defines a plurality of securing holes, a plurality of securing members pass through the securing holes and inserted into the positioning hole to secure the bracket on the base plate.

9. The projector combination of claim 7, wherein the fan is received in the bracket, the fan is configured to drive the airflow to cool the light emitting module.

10. The projector combination of claim 9, wherein the fan module comprises a plug, the projector comprises a connector, the plug is configured to be inserted into the connector.

11. The projector combination of claim 7, wherein the each side of the connector is equipped with a latch plate, one end of the latch plate is equipped with a latch block, the latch plate can be elastically deformed to pass through the protrusions and to let the latch block be secured on the protrusions.

12. The projector combination of claim 7, wherein the air duct defines a plurality of mounting holes, a plurality of securing members are configured to pass through the mounting holes to secure the air duct in the projector.

* * * * *